US008868521B2

(12) United States Patent
Moe

(10) Patent No.: US 8,868,521 B2
(45) Date of Patent: Oct. 21, 2014

(54) METHOD FOR IMPROVING SECURITY IN DISTRIBUTION OF ELECTRONIC DOCUMENTS

(75) Inventor: Petter Moe, Billingstad (NO)

(73) Assignee: Microsoft International Holdings B.V., Amsterdam (NL)

( * ) Notice: Subject to any disclaimer, the term of this patent is extended or adjusted under 35 U.S.C. 154(b) by 295 days.

(21) Appl. No.: 12/324,715

(22) Filed: Nov. 26, 2008

(65) Prior Publication Data

US 2009/0157603 A1  Jun. 18, 2009

(30) Foreign Application Priority Data

Dec. 14, 2007  (NO) .................................... 20076454

(51) Int. Cl.
*G06F 17/30* (2006.01)
*H04L 29/06* (2006.01)
(52) U.S. Cl.
CPC .................................. *H04L 63/105* (2013.01)
USPC ....................................................... 707/694
(58) Field of Classification Search
CPC ....... G06Q 10/10; G06Q 30/06; G06Q 10/08; G06Q 10/107; G06Q 30/0635; G06Q 30/02; G06Q 30/0222; G06Q 30/04; G06Q 30/0601; G06Q 30/0613; G06Q 10/00; G06Q 10/06; G06Q 10/0631; G06Q 10/0633; G06F 17/30613; G06F 17/30321; G06F 17/30699; G06F 21/72
USPC ................................................. 707/694, 784
See application file for complete search history.

(56) References Cited

U.S. PATENT DOCUMENTS

| 6,898,636 | B1 | 5/2005 | Adams et al. | |
|---|---|---|---|---|
| 7,636,841 | B2 * | 12/2009 | Wanek et al. | 713/163 |
| 2004/0049696 | A1 * | 3/2004 | Baker et al. | 713/201 |
| 2005/0010799 | A1 * | 1/2005 | Kelley et al. | 713/200 |
| 2006/0218399 | A1 | 9/2006 | Fitzgerald | |
| 2007/0157307 | A1 | 7/2007 | Katoh | |
| 2007/0261099 | A1 | 11/2007 | Broussard et al. | |
| 2007/0300300 | A1 * | 12/2007 | Guo et al. | 726/23 |

FOREIGN PATENT DOCUMENTS

WO 98/40992 9/1998

OTHER PUBLICATIONS

International Search Report mailed Jul. 15, 2009, in PCT/NO2008/000403 (WO2009/078727).

* cited by examiner

*Primary Examiner* — Dinku Gebresenbet
(74) *Attorney, Agent, or Firm* — Tom Wong; Jim Ross; Micky Minhas

(57) ABSTRACT

In the distribution of electronic documents within an organization or across the perimeter of the organization, security is an important issue as the documents may be sensitive to a larger and a smaller degree. The distribution specifically takes place between individual persons and groups of persons either within or outside the organization, and on data communication networks including both intranets and extranets. In order to improve the security communication paths are determined for each distributed document on the basis of the set of all mappings of communication relations between senders or documents providers and all potential and actual recipients of the documents, including temporal parameters. Determined communication paths are used to compute a degree of sensitivity for the document, and this degree of sensitivity is used to monitor and limit the distribution of the document in compliance with an established security scheme for the organization.

15 Claims, No Drawings

METHOD FOR IMPROVING SECURITY IN DISTRIBUTION OF ELECTRONIC DOCUMENTS

BACKGROUND

The degree of sensitivity of a document is the degree to which it will or is assumed to hurt the organization if the information contained therein becomes accessible to non-authorized parties. This degree of sensitivity is in many organizations provided by documents being explicitly classified, but a document may be sensitive also without such classification.

Organizations are concerned with internal information is becoming available to people or entities outside the group trusted with the information. This may take many forms, one of which being when someone internal to the organization wilfully or by accident, sends classified documents out across the organization perimeter using an electronic mail system. This process is called "out-trusion". Outtrusion can be very costly to an organization, since company secrets, intellectual property, or operations status information may lead to loss of money, trust, or ability to execute. There is also an increasing amount of legislation enforcing procedures that companies must adhere to.

To detect and/or prevent outtrusion the mail system transporting mail across the organization perimeter will often use a "compliance monitoring" system, whose purpose it is to detect when someone is not compliant with the policies of the organization. Such policies will typically define classes of documents, and describe how each such class should be treated. An example would be to state that patent applications must not be sent outside the company.

In order to detect when a policy is being violated, the compliance monitoring system must be able to detect how sensitive a document is. This is today typically done by one of the following methods:

Explicit identification of all classified documents. In this case, there exists an inventory of documents that must be treated in a special way.

Form-based identification. In this case, the system would for instance look for the word "confidential" in given locations in the document, or documents based on a specified document template.

Content-based identification. In this case, the document would be analyzed and matched towards a dictionary of words indicative of sensitivity, or perform a more advanced matching towards a taxonomy of classified documents.

All these methods have weaknesses.

Explicit and form-based identification both require a process to be in place, and is costly due to the manual work involved. The process is also prone to error, based on misclassification or failure to comply with the process. Also, if the content is taken out of the document and copied into another, these detection methods will not be accurate.

Content-based identification is hard, since the difference between a very sensitive document and a public one may not be easy to spot automatically. Financial statements, for instance, are very sensitive before they are published and public knowledge afterwards. No linguistic process based on the content would spot that difference, short of looking for the publication date and comparing to the time of sending (which would be a variant of form-based identification).

A prior art illustrative example of an explicit identification has been disclosed in U.S. Pat. No. 6,898,636 B1 (Adams & al.), where intended recipients of documents are selected and provided with an identifier which need not be more than an email address, and where a security designation then is added to the identifier. Documents which are to be sent, are also provided with a corresponding security designation and uploaded to a server which notifies the recipient with the same security designation as the documents concerned such that the latter can be downloaded. If a request for downloading is received, the documents may be encrypted and sent to the recipient.

Further US published application No. 2007/0261099 A1 (Broussard & al.) discloses how a search engine is used for security compliance and identifying confidential content and security violations with regard to this content on a document level. The results can be reported to a user and corrective actions proposed. For instance encryption may be undertaken. If the documents are to be sent as electronic mail, the list of recipients can be modified automatically using a security mechanism in accordance with the proposed corrective actions and on the same basis changes may be made to the content of the document.

SUMMARY

The invention concerns a method for improving security in distributing electronic documents on data communication networks including intra nets and extra nets, wherein the distribution takes place within an enterprise or organization or across the perimeter of the enterprise or organization, and between individual persons or groups of persons within or outside the enterprise or organization.

In view of the above-mentioned weaknesses of the prior art it is a primary object of the present invention to provide a method for improving security in distributing electronic documents on data communication networks.

Another object of the present invention is to enable the detection and prevention of attempts to distribute sensitive electronic documents within an enterprise or organization or across a perimeter of the same.

These objects as well as other features or advantages are realized according to the invention with a method which is characterized by determining a communication path for each distributed document as the set of all mappings from a sender or provider of document to all potential or actual recipients thereof, and a time of a scheduled or actual distribution of the document attached to a mapping, storing the determined communication paths, computing a degree of sensitivity of the document, and applying the computed degree of sensitivity to monitor and limit the distribution of the document inside the enterprise or organization as well as across the perimeter thereof.

Further features and advantages of the method according to the present invention shall be apparent from the appended dependent claims.

DETAILED DESCRIPTION

The present invention shall be better understood by reading the following discussion of exemplary embodiments thereof, as set out below.

In the following discussion, the concept "content signature" shall be understood as an abstract representation of the content of a document, representing significant content elements, such as names, product names, classifiers, or any other entity that usefully classifies documents, or a vector of terms that appear statistically over-represented in a document, based on a reference corpus.

Also for the purpose of explanation there shall be introduced the notions of a set of trust domains, and a sequence of trust levels, in which the examples given to illustrate the present invention respectively will be termed D"domain" etc for the domains, and L1, L2, etc, for the levels, L1 being the most trusted. Then each person can be allocated a trust vector, for instance {D"legal"1, D"financial"3} for a person who is authorized on the highest level to see legal information, and much less for financial information.

Contemporary search engines are able to return calculated values, based on metadata of documents found as the result of a search. Assuming that an index is created based on the aforementioned records of each communication within an organization, and assuming also that the search result when searching for a document identifier or content signature returns aggregate values for all records, including the count of recipients of a given document, and the count for each defined category of users. This aggregate can be seen as a basic representation of a communication path, and used for classification of for instance any document that has been sent.

The method of the present invention thus is based on a different aspect of a document, namely its "communication path." A communication path is defined as the set of ways a document has been sent, in its final or intermediate form, before the point in time where compliance is being evaluated. The communication path of a document will typically fall into one of a set of classes, and the mapping to such a class shall serve to establish the degree of confidentiality.

For instance, person A within a company tries to send a document to person B outside the organization. One of the following may be true:

The document has been sent to B before. In this case, no new information is being leaked.

The information has been sent repeatedly within the organization, to a large number of recipients. The document is unlikely to be very sensitive.

The information has only been sent back and forth within a very small group of very trusted individuals, e.g. the CEO, the CFO, and the corporate counsel. It has never been sent outside the organization. The document is likely to be sensitive.

In order to establish communication paths, all internal communication within an organization should be tracked. In order to track mail-based communication a search engine can be used, to which data is fed from a mail system connector. A mail system connector is invoked periodically or reactively when sending a message. It then creates a record of each communication, which contains at least sender, recipient, and the identifier of any document being sent. In addition, other data of each communication can also be stored, for instance to create a searchable index of the content of mail messages and attachments. Such indexing offers useful search functionality to end users, and provides persons responsible for compliance monitoring means for analyzing communication patterns.

Imagine a scenario where person A with trust "DA1B3" sends a document to person B with trust "DA1B3". Person B adds some comments and returns. Person A then sends it to person B and person C with trust "DA2B2". Person C sends it out of the organization, to an untrusted entity, assumed to have trust level "DA4B4".

At this point, the communication path shows that the distribution of this document had been limited within a small group before being sent out of the organization. The degree of sensitivity for the document can be computed based on this communication path. A simplistic algorithm for evaluating document sensitivity would be the least secure value for each domain, lowered by one for documents with more than 5 readers and set to the lowest level for any document seen by more than 20 people. Based on this algorithm, the sensitivity level of the document in the above example is "DA2B3". This is more sensitive than unnamed external entities, meaning the sending of the document should be flagged as a potential outtrusion.

Typically, potential outtrusions would be handled by blocking communication of a document, and/or alerting appropriate parties, which could be a person monitoring compliance, or the sender, in the case of accidental outtrusion.

From the above it is thus seen that in a preferred, albeit simple embodiment of the method of the invention, one or more static rules can be used to define a subset of the communication paths as critical. As stated, criticality could for instance be asserted on basis of the lowest ranking recipient of the document, or after determining the communications paths of the document, by a ranking applied thereto.

However, resorting to static rules for determining critical communication paths is generally an over-simplification. In enterprises or organizations with complicated structures for handling and communicating documents a system for outtrusion detection embodying a more refined variant of the method of the present invention shall be designed to match inherent dynamic properties of the above-mentioned structures.

In other words, the system must be both adaptive and evolving. To this end the method of the present invention provides a learning function to the outtrusion detection system. To facilitate the training thereof all records of communication should be retained. Then communication paths should be selected as examples of innocent communication, i.e. non-outtrusion, or actual outtrustion, and machine-learning methods should be applied to train the system to separate benevolent from malicious activity.

The invention claimed is:

1. A method for improving security in distributing electronic documents on data communication networks, the method comprising:

using a processor as part of classifying a document according to a communication path that defines a set of different ways to send the document, wherein the communication path for the document comprises a record for each communication of the document to trusted and untrusted recipients including each of different and previous ways the document has been sent to different recipients that each have a trust level that includes different trust levels from untrusted to trusted, in a final or intermediate form, before a point in time where compliance is being evaluated, wherein the communication path for the document is further defined in part as an aggregated value that includes a count of recipients of the document and a count for each defined category of users;

computing, using the processor, at the time where compliance is being evaluated, a degree of sensitivity of the document based in part on the communication path to distribute the document determined in part using each of the trust levels of each of the different recipients that are included in the communication path for the document;

applying, using the processor, the degree of sensitivity to monitor and limit distribution of the document; and storing each communication of the document associated with the communication path and creating a searchable index from each stored communication.

2. The method according to claim 1, further comprising searching and retrieving the communication path by means of a search engine or an enterprise search system.

3. The method according to claim 1, further comprising defining the communication path as critical on basis of rules that are static.

4. The method according to claim 3, further comprising defining the communication path as critical on basis of a lowest ranked recipient of the document or by a ranking applied to the document.

5. The method according to claim 1, further comprising defining a subset of communication paths as critical on the basis of actual and observed communication paths, such that the subset of critical communication paths is generated and updated dynamically.

6. The method according to claim 5, further comprising defining the communication path as critical on basis of communication paths for documents classified as sensitive based on computed degrees of sensitivity of the communication paths.

7. The method according to claim 1, further comprising:
creating a record of each communication within an organization, the record of a communication containing at least a sender of the communication, a recipient of the communication, and an identifier of any document being sent in the communication; and
using the records to determine the communication path for the document.

8. The method according to claim 1, wherein the point in time where compliance is being evaluated is a time of a scheduled distribution of the document.

9. The method according to claim 1, wherein applying the degree of sensitivity to monitor and limit distribution of the document includes applying the degree of sensitivity to monitor and limit distribution of the document inside an organization.

10. The method according to claim 1, wherein applying the degree of sensitivity to monitor and limit distribution of the document includes applying the degree of sensitivity to monitor and limit distribution of the document across a perimeter of an organization.

11. The method according to claim 1, wherein limiting the distribution of the document comprises blocking communication of the document.

12. The method according to claim 1, wherein limiting the distribution of the document comprises alerting an appropriate party.

13. The method according to claim 1, wherein limiting the distribution of the document comprises alerting a sender of the document.

14. The method according to claim 1, wherein computing the degree of sensitivity of the document based on the communication path comprises:
training a learning function to separate benevolent activity from malicious activity using communication paths; and
using the learning function to compute the degree of sensitivity of the document based on the communication path of the document.

15. A method for improving security in distributing electronic documents, the method comprising:
generating records for each communication that is sent within an organization to untrusted recipients and trusted recipients using a processor, each of the records containing at least a sender of a communication, a recipient of the communication, and an identifier of any document being sent in the communication;
creating, using the processor, based on the records, a searchable index of content of communications and documents attached to the communications;
applying machine-learning methods, using the processor, to train a learning function to separate different types of communications; and
before a distribution of a given document:
using the searchable index to determine a communication path as part of classifying the given document, wherein the communication path defines a set of different ways to send the given document using the processor, the communication path of the given document indicating each of the ways that final or non-final forms of the given document have been sent between users prior to the distribution of the given document including a trust level that is different between at least some of the recipients, wherein the communication path for the given document is further defined in part as an aggregated value that includes a count of recipients of the given document and a count for each defined category of users;
using the learning function to determine a degree of sensitivity of the given document based on the communication path of the given document using the processor; and
blocking the distribution of the given document in response to determining that the degree of sensitivity of the given document is critical using the processor.

\* \* \* \* \*